(12) United States Patent
Gassew

(10) Patent No.: US 7,293,518 B1
(45) Date of Patent: Nov. 13, 2007

(54) YACHT FENDER HOOK

(76) Inventor: Garry L. Gassew, 3001 SW. 3$^{rd}$ Ave., Unit 1, Ft. Lauderdale, FL (US) 33315

( * ) Notice: Subject to any disclaimer, the term of this patent is extended or adjusted under 35 U.S.C. 154(b) by 0 days.

(21) Appl. No.: 11/786,600

(22) Filed: Apr. 12, 2007

(51) Int. Cl.
*B63B 59/02* (2006.01)

(52) U.S. Cl. .................. 114/219; 114/230.11; 114/364

(58) Field of Classification Search ............... 114/219, 114/230.11, 364
See application file for complete search history.

(56) References Cited

U.S. PATENT DOCUMENTS

| | | | | |
|---|---|---|---|---|
| 2,473,778 A | * | 6/1949 | Benes | 43/21.2 |
| 3,120,831 A | * | 2/1964 | Fulton | 114/230.11 |
| 4,280,435 A | * | 7/1981 | Loomis | 114/219 |
| 4,799,444 A | * | 1/1989 | Lisowski | 114/221 R |
| 4,895,094 A | * | 1/1990 | Carlstedt | 114/218 |
| 5,732,645 A | * | 3/1998 | Lemke | 114/219 |
| 6,021,729 A | * | 2/2000 | DeRuscio | 114/219 |
| 6,328,706 B1 | * | 12/2001 | Yattavong | 602/21 |
| 6,983,711 B1 | * | 1/2006 | Lemke | 114/219 |
| 7,175,603 B2 | * | 2/2007 | Fritsch et al. | 602/20 |

* cited by examiner

*Primary Examiner*—Stephen Avila
(74) *Attorney, Agent, or Firm*—Gold & Rizvi, P.A.; Glenn E. Gold; H. John Rizvi

(57) ABSTRACT

A fender hook for a boating vessel is provided. The fender hook includes a rigid core form having a leather outer covering and a sheep's wool interior lining. The fender hook is particularly designed for use with yachts having a relatively steep-pitched exterior hull wall. In further aspects, the fender hook may have a fishing rod holder or a mooring whip holder fixedly attached thereto.

8 Claims, 4 Drawing Sheets

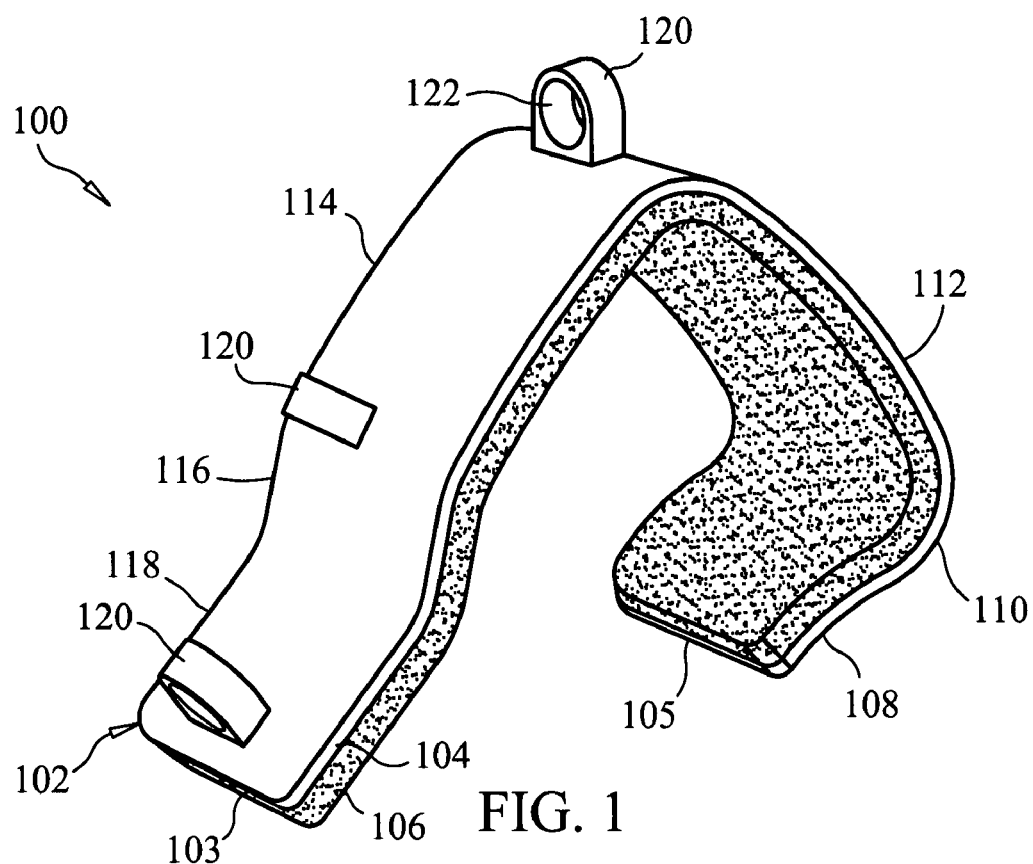
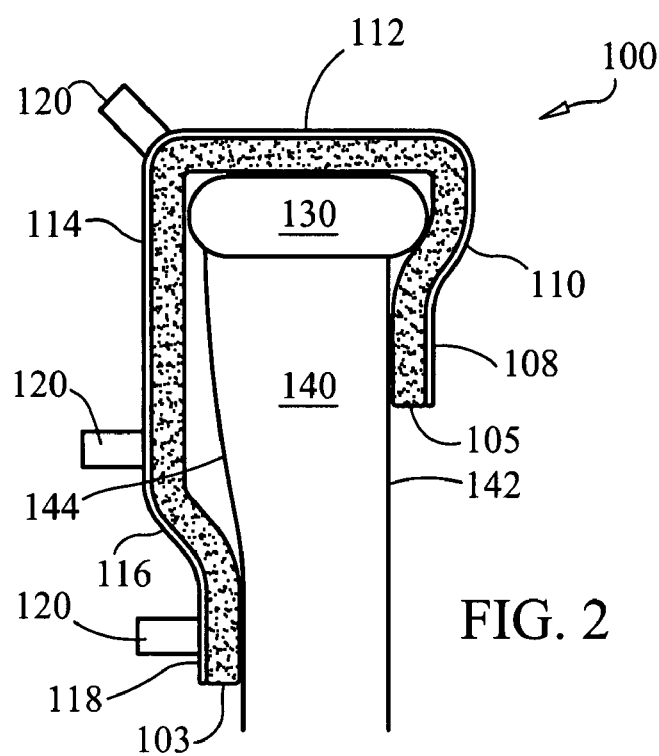

YACHT FENDER HOOK

BACKGROUND OF THE INVENTION

1. Field of the Invention

The present invention relates generally to mooring products for boating vessels. More particularly, the present application involves an improved fender hook for a yacht.

2. Discussion of the Related Art

The surface of a new yacht is coated with a thin gel coat or paint over the glass fiber hull, which is vulnerable to abrasion. Boat or yacht fenders are commonly used as a buffer between vessels, or between a vessel and a pier, to prevent damage to the vessel during mooring and docking. Fender hooks allow boat fenders to be safely suspended from handrails, pipe rails and gunwales, without causing damage to the yacht itself. They are used to protect a yacht's varnish, paint and polished areas, which are typically subjected to chafe caused from lines securing the yacht's fender systems.

Many new yacht designs incorporate an exterior hull body having a relatively steep inward taper. When hanging a conventional fender hook over the cap rail covering of a gunwale, the steep inward taper can causes the fender hook to engage the cap rail and hull body in a relatively loose manner. Expensive yachts often have very high-end expensive cap rails overlaying the gunwale. Fender hooks loosely disposed over a cap rail can exert stress against the inside edges of the cap rail, resulting in damage. Therefore, there is a need for a fender hook having a construction and geometry that overcomes this drawback by enabling the fender hook to engage the cap rail and exterior hull surface in a secure manner that minimizes stress on the inside edges of the cap rail.

Most conventional fender hooks have limited functionality. That is, they are constructed specifically for the purpose of enabling fenders to be safely suspended from handrails, pipe rails and gunwales, without causing damage to the yacht itself. It would be highly desirable to provide a fender hook having auxiliary structural components for facilitating the use of the fender hook for other purposes, such as, for example, holding a mooring whip or a fishing rod.

SUMMARY OF THE INVENTION

Various features and advantages of the invention will be set forth in part in the following description, or may be obvious from the description, or may be learned from practice of the invention.

One aspect of the present invention provides for a fender hook for a large boating vessel, or yacht, which is configured for being snugly engaged around a gunwale cap rail. The fender hook includes a rigid core form having a resilient, non-abrasive, lining covering an interior surface of the core form, and a layer of leather covering an exterior surface of the core form.

In another aspect of the invention, the rigid core form further comprises:

a central portion configured for snugly wrapping around a vessel cap rail;

a first inwardly offset downward depending portion terminating at an upper end and configured for snugly engaging an interior vessel hull wall; and a second inwardly offset downward depending portion terminating at a lower end, and configured for snugly engaging an exterior vessel hull wall.

The present invention also provides for a fender hook having a plurality of pad eyes disposed along its exterior for receiving and guiding a length of fender rope in a direction away from the vessel to prevent abrasion damage.

Also included in a further aspect of the present invention is a fender hook having a fishing rod holder attached thereto for holding a fishing rod.

An additional aspect of the present invention exists in a fender hook having a mooring whip holder attached thereto for holding a mooring whip.

These and other features, aspects and advantages of the present invention will become better understood with reference to the following description and appended claims. The accompanying drawings, which are incorporated in and constitute part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended Figs., in which:

FIG. 1 is a perspective view of a fender hook for in accordance with one exemplary embodiment of the present invention.

FIG. 2 is a side view of the fender hook of FIG. 1 positioned over a gunwale cap rail in typical use.

Figure 3:
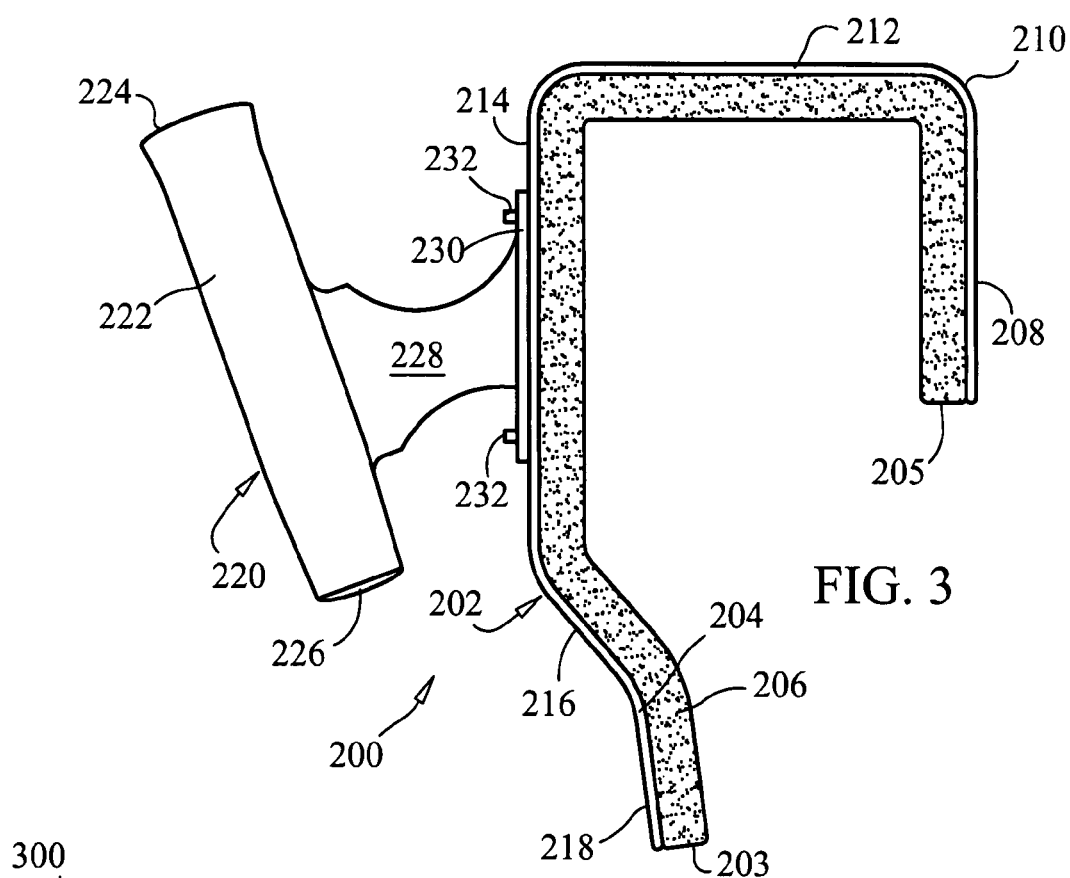
FIG. 3 is a side view of a fender hook having a fishing rod holder in accordance with another exemplary embodiment of the present invention.

Repeat use of reference characters in the present specification and drawings is intended to represent the same or analogous features or elements of the invention.

DETAILED DESCRIPTION OF REPRESENTATIVE EMBODIMENTS

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

The present application provides for an improved fender hook that is particularly well suited to be snugly engaged about the cap rail of a yacht. Referring now to FIG. 1, an exemplary embodiment of the fender hook, shown generally as reference numeral 100, includes a fender hook body 102. The fender hook body has a pre-formed rigid core (not shown), preferably constructed from a metal such as aluminum or stainless steel. The exterior surface of the core is covered with a premium-grade, maintenance free heavyweight leather layer 104. The interior surface of the core is covered with a surface lining 106, preferably sheep's wool, particularly well-suited to prevent abrasion or other damage to the cap rail finish, vessel hull and other exposed surfaces.

Referring now to FIGS. 1 and 2, a significant feature of the fender hook 100 resides in its shape or geometry. The fender hook body 102 extends from a lower end 103 to an upper end 105. During use, main horizontal portion 112 is positioned or disposed directly over the upper surface of cap rail 130, which runs atop the gunwale portion of the yacht hull wall, shown generally as reference numeral 140. Fender hook body portion 110 extends (to the right in FIG. 2) around the interior edge of cap rail 130. From body portion 110, vertical portion 108 is inwardly stepped in such a manner that it snugly engages the interior surface 142 of vessel hull 140. Fender hook body portion 114 extends (to the left in FIG. 2) around the exterior edge of cap rail 130, depending in a generally vertical downward direction therefrom. Approaching the lower end 103, the fender hook body 102 has an inward bend 116 terminating at inwardly stepped portion 118 which, in use, snugly engages exterior surface 1447 of hull wall 140. A plurality of pad eyes 120, or similar hardware, is disposed along the length of the fender hook for receiving and guiding a fender line (not shown) through pad eye openings 122. The fender hook enables a fender (not shown) to be hung from the side of the yacht while preventing contact between the fender line (not shown) and the yacht surfaces. The particular geometric configuration of the present invention enables the fender hook 100 to be engaged snugly about the gunwale or gunwale cap rail of a yacht hull in such a manner that the fender hook is not subject to displacement due to relatively steep inward tapering associated with many new yacht hull designs.

Referring now particularly to FIG. 3, in a further exemplary embodiment of the present invention, a fender hook 200 is provided having a fishing rod holder 220 securely attached to a fender hook body 202. Fender hook 200 has a construction similar to that of fender hook 100. That is, the fender hook is constructed from a rigid core form (not shown) having a leather exterior covering 204 and an interior sheep's wool lining 206. The fender hook body extends from lower end 203 to upper end 205, and has formed geometry defined by portions 208, 210, 212, 214, 216 and 218. The geometry facilitates snug fitting of the fender hook about a gunwale, gunwale cap rail or like yacht structure, in a manner preventing displacement of the fender hook during use.

Figure 6:
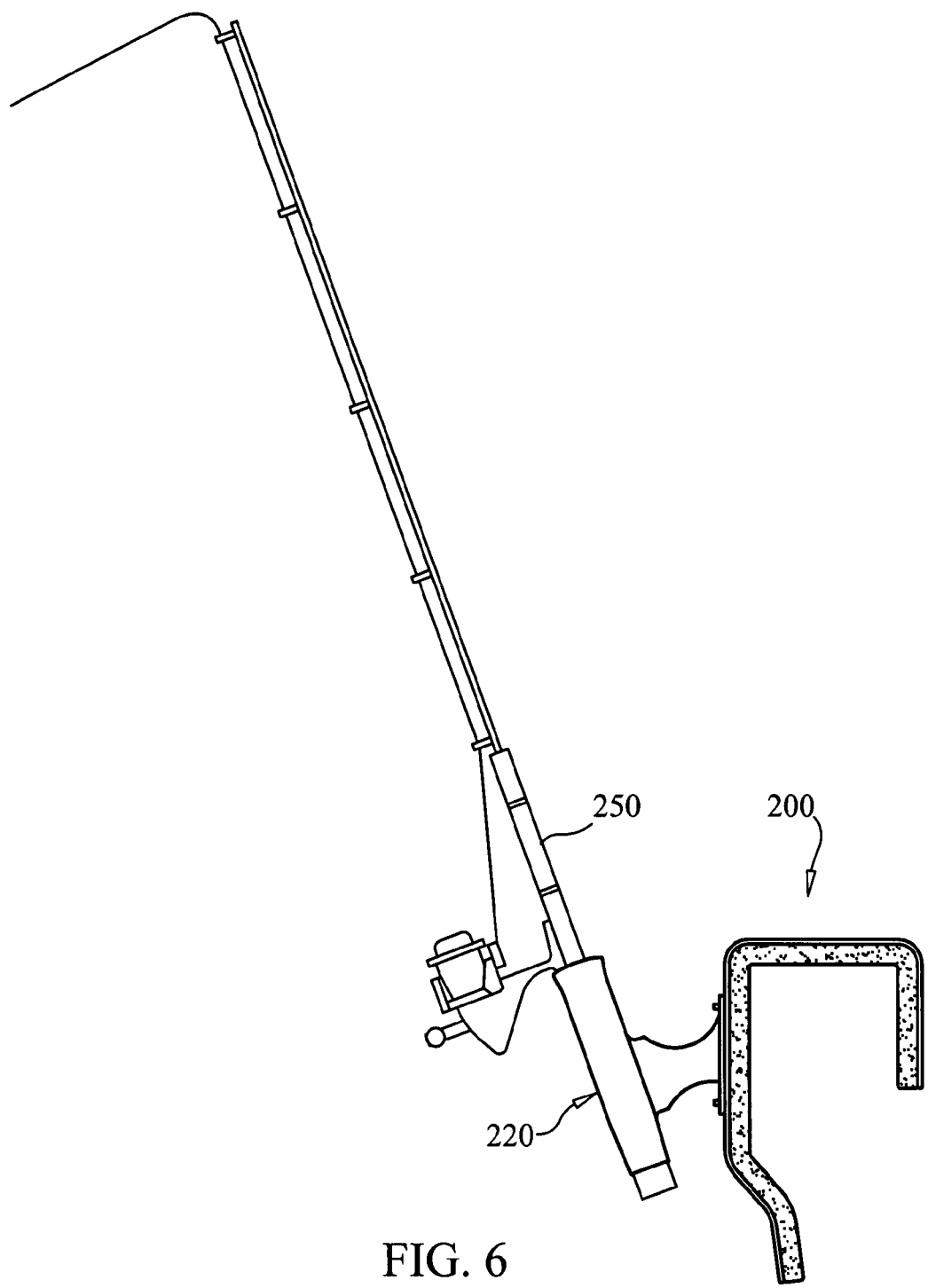
FIG. 6 is a side view showing the fender hook of FIG. 3 having a fishing rod disposed in the fishing rod holder.

The fishing rod holder 220 includes a main holder body 222 having an upper opening 224, sized and shaped for receiving the rod handle, and a lower end 226 configured for supporting the butt of the rod handle. The rod holder body 222 is adjoined to a metal plate 230 via a rigid structural portion 228, which maintains the holder body offset from the plate 230 and angled away from the fender hook body 202. In this manner, the fender hook provides the additional functionality of a fishing rod holder. Referring briefly to FIG. 6, the fender hook 200 is shown with a fishing rod 250 disposed in the rod holder 220. Metal plate 230 is securely fastened to the rigid metal core of the fender hook via mechanical fasteners 232.

Figure 4:
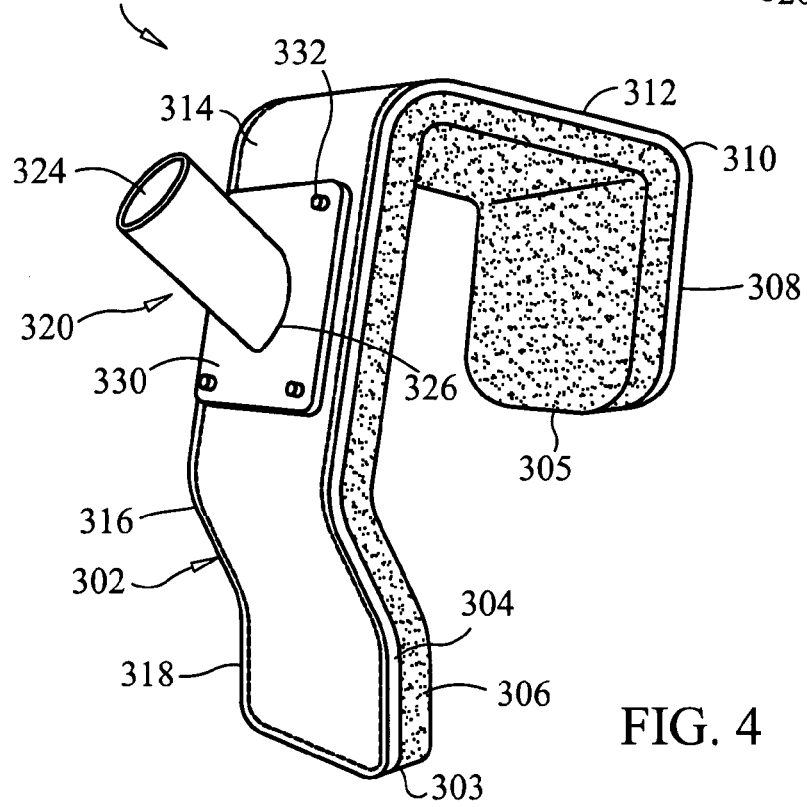
FIG. 4 is a perspective view of a fender hook having a mooring whip holder in accordance with another exemplary embodiment of the present invention.

Referring now particularly to FIG. 4, in a further exemplary embodiment of the present invention, a fender hook 300 is provided having a mooring whip holder 320 securely attached to a fender hook body 302. Fender hook 300 has a construction similar to fender hook 200. That is, the fender hook is constructed from a rigid core form (not shown) having a leather exterior covering 304 and an interior sheep's wool lining 306. The fender hook body extends from lower end 303 to upper end 305, and has formed geometry defined by portions 308, 310, 312, 314, 316 and 318. The geometry facilitates snug fitting of the fender hook about a gunwale, gunwale cap rail or like yacht structure, in a manner preventing displacement of the fender hook during use.

Figure 5:
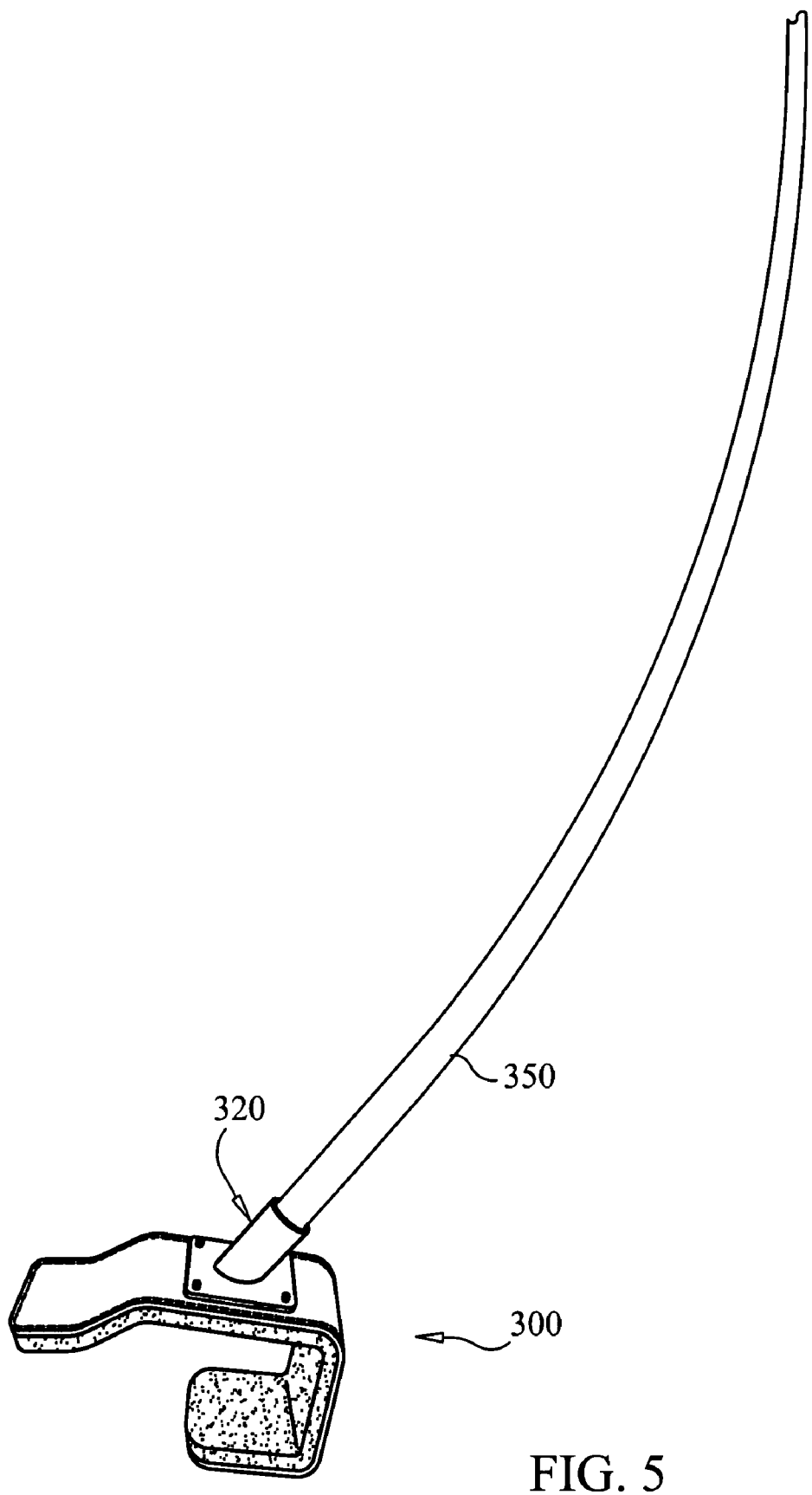
FIG. 5 is a perspective view showing the fender hook of FIG. 4 having a mooring whip disposed in the mooring whip holder.

The mooring whip holder 320 includes a main cylindrical holder body 326 having an upper opening 324 sized and shaped for receiving the proximal end of a mooring whip. The mooring whip holder body 326 is welded, or otherwise directly adjoined to a metal plate 330, which in turn is securely fastened to the rigid metal core of the fender hook via mechanical fasteners 332. The mooring whip holder body 326 extends from the plate 330 at an upward angle. Referring briefly to FIG. 5, the fender hook 300 is shown with a mooring whip 350 disposed in the mooring whip holder 320.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed is:

1. A fender hook for suspending a fender from a boating vessel, comprising:
   a rigid core form having an interior surface and an exterior surface;
   a resilient, non-abrasive lining covering the interior surface of said core form;
   a layer of leather covering the exterior surface of said core form; and
   said rigid core form further comprising:
      a central portion configured for snugly wrapping around a vessel cap rail;
      a first inwardly offset downward depending portion terminating at an upper end, said first inwardly offset portion configured for snugly engaging an interior vessel hull wall; and
      a second inwardly offset downward depending portion terminating at a lower end, said second inwardly offset portion configured for snugly engaging an exterior vessel hull wall.

2. A fender hook as recited in claim 1, wherein said rigid core form further comprises a metal.

3. A fender hook as recited in claim 2, wherein said rigid core form further comprises aluminum.

4. A fender hook as recited in claim 2, wherein said rigid core form further comprises stainless steel.

5. A fender hook as recited in claim 1, wherein said resilient, non-abrasive lining further comprises sheep's wool.

6. A fender hook as recited in claim 1, further comprising a plurality of pad eyes disposed along the exterior surface of said leather layer.

7. A fender hook as recited in claim 1, further comprising a fishing rod holder fixedly attached to said rigid core form.

8. A fender hook as recited in claim 1, further comprising a mooring whip holder fixedly attached to said rigid core form.

* * * * *